US010003559B2

(12) United States Patent
Narayanswamy et al.

(10) Patent No.: US 10,003,559 B2
(45) Date of Patent: Jun. 19, 2018

(54) AGGREGATING REDUNDANT MESSAGES IN A GROUP CHAT

(71) Applicant: International Business Machines Corporation, Armonk, NY (US)

(72) Inventors: Mohan Narayanswamy, Bangalore (IN); Uttam Setty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 14/939,159

(22) Filed: Nov. 12, 2015

(65) Prior Publication Data

US 2017/0142043 A1    May 18, 2017

(51) Int. Cl.
G06F 15/16 (2006.01)
H04L 12/58 (2006.01)
G06F 17/27 (2006.01)
G06F 17/30 (2006.01)

(52) U.S. Cl.
CPC .......... H04L 51/12 (2013.01); G06F 17/2765 (2013.01); G06F 17/30705 (2013.01); H04L 51/16 (2013.01)

(58) Field of Classification Search
CPC ..... H04L 51/12; H04L 51/16; G06F 17/2765; G06F 17/30705
USPC ......................................................... 709/206
See application file for complete search history.

(56) References Cited

U.S. PATENT DOCUMENTS

| | | | |
|---|---|---|---|
| 8,055,592 B2 | 11/2011 | Boyle et al. | |
| 2013/0198299 A1* | 8/2013 | Chhaochharia | H04L 51/04 709/206 |
| 2014/0324997 A1* | 10/2014 | Lee | H04L 51/14 709/206 |
| 2014/0379818 A1* | 12/2014 | Cudak | H04L 51/16 709/206 |
| 2016/0065519 A1* | 3/2016 | Waltermann | H04L 67/10 709/206 |
| 2016/0094505 A1* | 3/2016 | Taylor | G06F 17/3089 709/206 |

(Continued)

FOREIGN PATENT DOCUMENTS

WO    02093414 A1    11/2002

OTHER PUBLICATIONS

Mell et al., "The NIST Definition of Cloud Computing", National Institute of Standards and Technology, Special Publication 800-145, Sep. 2011, pp. 1-7.

(Continued)

Primary Examiner — Frantz Jean
(74) Attorney, Agent, or Firm — Reza Sarbakhsh

(57) ABSTRACT

Embodiments of the present invention provide a method, system, and computer program product for aggregating redundant messages in a group chat. A computer may receive a plurality of messages in a group chat from one or more chat devices. The computer may extract a fact from each of the plurality of messages using natural language processing. The computer may identify redundant messages within the plurality of messages. The computer may aggregate the redundant messages into a combined message. The computer may provide the combined message to the group chat. A number of redundant messages aggregated in the combined message may be provided. The redundant messages may be provided.

20 Claims, 7 Drawing Sheets

(56) References Cited

U.S. PATENT DOCUMENTS

2016/0156580 A1\* 6/2016 Krka ..................... H04L 51/14
                                                                                        709/206

OTHER PUBLICATIONS

Ismael, "List of 25+ Natural Language Processing APIs" http://blog.mashape.com/list-of-25-natural-language-processing-apis/, printed Jul. 31, 2015, pp. 1-6.
http:radimrehurek.com/gensim/index.html, "Gensim Topic Modelling For Humans", printed Jul. 31, 2015, pp. 1-2.

\* cited by examiner

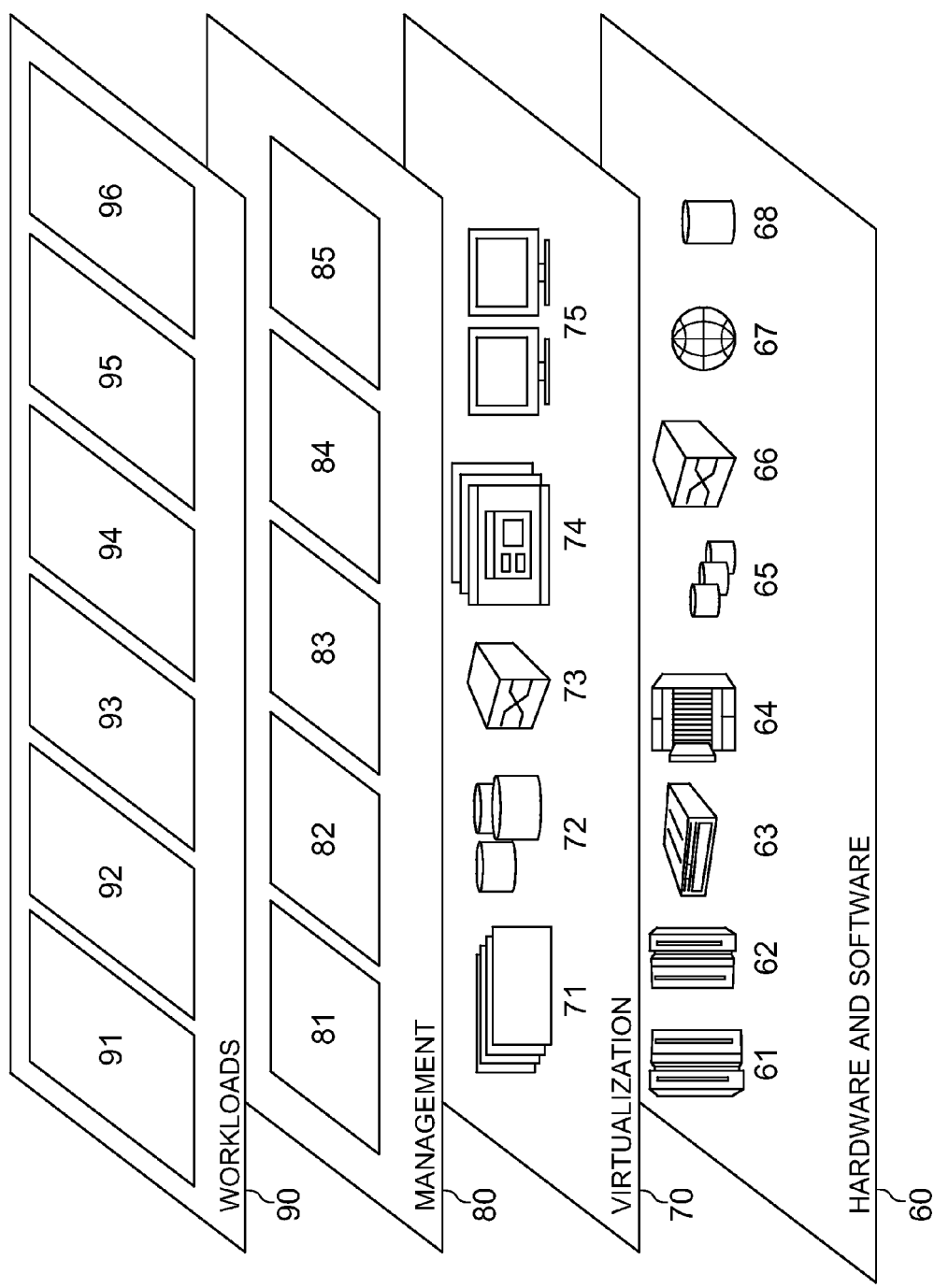

AGGREGATING REDUNDANT MESSAGES IN A GROUP CHAT

BACKGROUND

The present invention relates generally to the field of computing, and more particularly to a system and method of aggregating redundant messages in a group chat.

In an electronic group chat, multiple messages conveying the same meaning may be sent by people involved in the group chat. Redundant messages may be distracting or irritating, and may lead to a loss of one or more other messages in between the redundant messages. For example, a group chat in a typical web-conference may include a window containing sub-windows for a video, presentation, and/or group chat, etc. If audio fails during the web-conference due to a technical issue, one or more users may submit messages stating "No audio", "No voice", or "I cannot hear". These redundant messages may be distracting and an important message submitted between redundant messages may not be noticed.

SUMMARY

Embodiments of the present invention disclose a method for aggregating similar messages in a group chat on a computer. The method may include receiving a plurality of messages associated with the group chat from one or more chat devices. The plurality of messages may include at least a first message and a second message. The method may include determining a common fact associated with the first message and the second message. The determining may include extracting facts from the plurality of messages based on natural language processing, identifying a first fact associated with the first message and another fact associated with the second message, and determining the common fact based on a commonality between the first fact and the another fact. The method may include identifying redundant messages within the plurality of messages. The redundant messages may be associated with the common fact. The method may include aggregating the redundant messages into a combined message.

Embodiments of the present invention disclose a computer program product for aggregating similar messages in a group chat on a computer. The computer program product may comprise a computer readable storage medium having program instructions embodied therewith. The computer readable storage medium is not a transitory signal per se. The program instructions may be executable by a processor to cause a computer to perform a method. The method may include receiving a plurality of messages associated with the group chat from one or more chat devices. The plurality of messages may include at least a first message and a second message. The method may include determining a common fact associated with the first message and the second message. The determining may include extracting facts from the plurality of messages based on natural language processing, identifying a first fact associated with the first message and another fact associated with the second message, and determining the common fact based on a commonality between the first fact and the another fact. The method may include identifying redundant messages within the plurality of messages. The redundant messages may be associated with the common fact. The method may include aggregating\the redundant messages into a combined message.

Embodiments of the present invention disclose a computer system for aggregating similar messages in a group chat. The computer system may comprise one or more computer processors, one or more computer-readable storage media, and program instructions stored on the computer-readable storage media for execution by at least one of the one or more processors. The program instructions may include instructions to receive a plurality of messages associated with the group chat from one or more chat devices. The plurality of messages may include at least a first message and a second message. The program instructions may include instructions to determine a common fact associated with the first message and the second message. The instructions to determine may include instructions to extract facts from the plurality of messages based on natural language processing, instructions to identify a first fact associated with the first message and another fact associated with the second message, and instructions to determine the common fact based on a commonality between the first fact and the another fact. The program instructions may include instructions to identify redundant messages within the plurality of messages. The redundant messages may be associated with the common fact. The program instructions may include instructions to aggregate the redundant messages into a combined message.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

FIG. 6 depicts a set of functional abstraction layers provided by the cloud computing environment, in accordance with an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
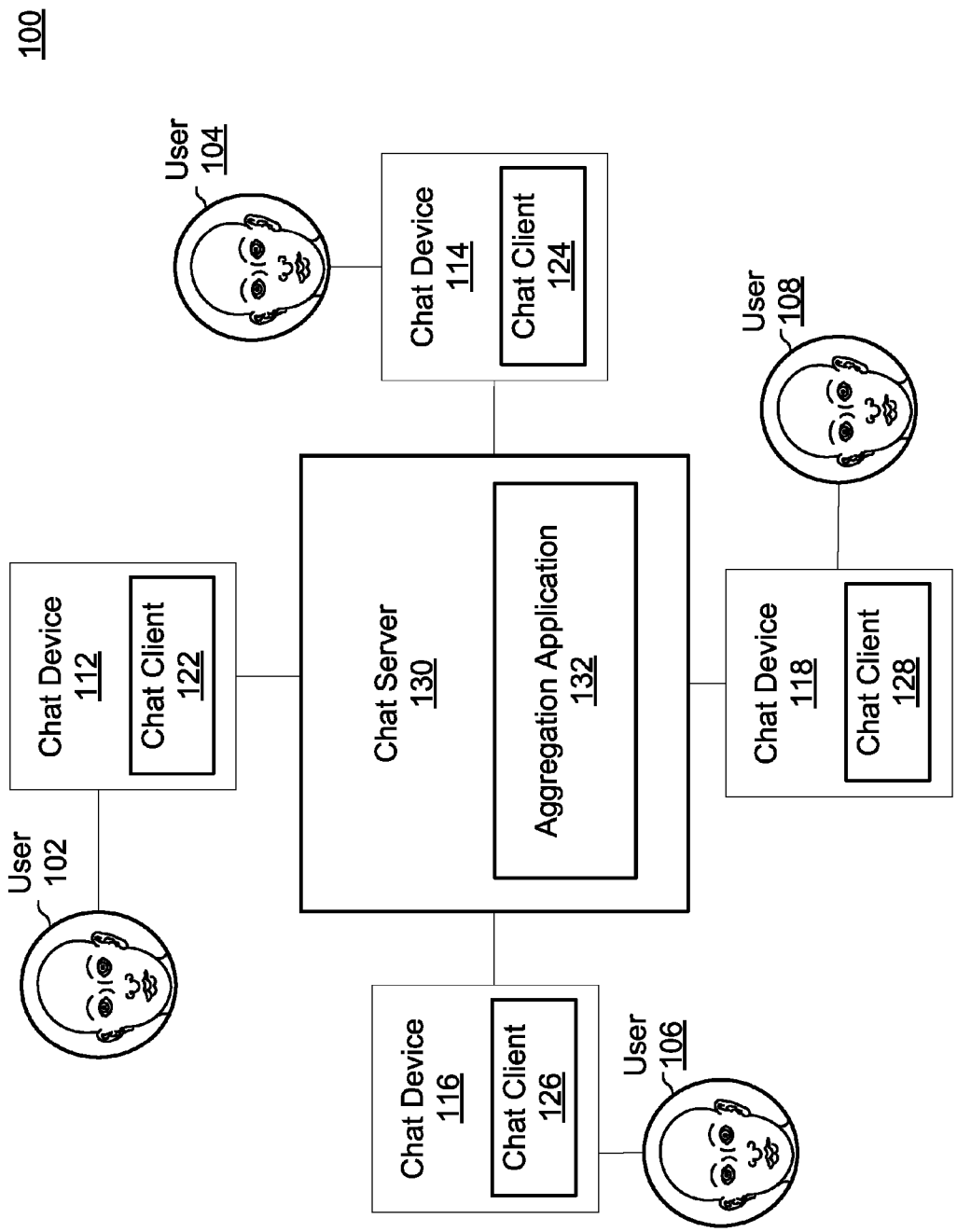
FIG. 1 is a functional block diagram illustrating a message aggregation system, in accordance with an embodiment of the present invention.

Detailed embodiments of structures and methods are disclosed herein; however, it can be understood that the disclosed embodiments are merely illustrative of structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

In the following description, numerous specific details are set forth, such as particular structures, components, materials, dimensions, processing steps, and techniques, in order to provide a thorough understanding of the present invention. However, it will be appreciated by one of ordinary skill of the art that the invention may be practiced without these specific details. In other instances, well-known structures or processing steps have not been described in detail in order to avoid obscuring the invention. It will be understood that when an element as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath," "below," or "under" another element, it can be directly beneath or under the other element, or intervening elements may be present. In contrast, when an element is referred to as being "directly beneath" or "directly under" another element, there are no intervening elements present.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the present invention may provide a method, system, and computer program product for aggregating redundant messages in a group chat. Embodiments of the invention involve a method to automatically and cogently organize redundant messages in a group chat. Organizing redundant messages in a group chat may ensure that non-redundant messages receive attention, for example, when non-redundant messages are submitted between redundant messages. By organizing redundant messages conveying a common fact, distraction due to bombardment of redundant messages may be reduced. By combining redundant messages into a single message, non-redundant messages may not be intermingled between redundant messages. Embodiments may provide names of users who sent one or more redundant messages. Embodiments may provide a number of times a redundant message has be sent. Embodiments may provide a time stamp for each transmission and/or receipt of a redundant message, which may help a user in deciding whether to respond. For example, an online lecture provider may determine whether or not to respond to a particular message based on a time stamp of the message. Embodiments of the present invention will now be described in detail with reference to FIGS. 1-6.

FIG. 1 is a message aggregation system 100, according to an aspect of the invention. In an exemplary embodiment, the message aggregation system 100 may include one or more chat devices, a chat client (e.g., chat client 122, chat client 124, chat client 126, and chat client 128), a chat server (e.g., chat server 130), and an aggregation application (e.g., aggregation application 132). Message aggregation system 100 may be implemented using a computing node such as the cloud computing node of FIG. 4. However, it is not necessary that the computing node described in FIG. 4 be a cloud computing node and may be implemented using a specialized computer. For example, the specialized computer may be located in one or more chat devices and include the aggregation application 132.

Message aggregation system 100 may include a network (not shown). The network may be any combination of connections and protocols that will support communications between chat server 130 and one or more chat devices (e.g., chat device 112, chat device 114, chat device 116, and chat device 118). In an embodiment, the network may be the Internet, representing a worldwide collection of networks and gateways to support communications between devices connected to the Internet. The network may include, for example, wired, wireless or fiber optic connections, or any combination thereof. In other embodiments, the network may be implemented as an intranet, a local area network (LAN), a wide area network (WAN), or a combination thereof.

Message aggregation system 100 may include a chat device or a plurality of chat devices (hereinafter "the chat devices"). For example, the chat devices may include chat device 112, chat device 114, chat device 116, and chat device 118. Each of the chat devices may be operated by one user, another user, or multiple users. For example, chat device 112, chat device 114, chat device 116, and chat device 118 may be operated by a user 102, a user 104, a user 106, and a user 108, respectively. The chat devices may be any device capable of receiving and transmitting messages. For example, the chat devices may be a cellular phone, tablet computer, laptop computer, desktop computer, another programmable electronic device, or any combination thereof. The chat devices may include a communication device, such as, for example, a Bluetooth device, WiFi device, near-field communication (NFC) device, radio frequency device, or any combination thereof. The chat devices may include one or more input devices, such as, for example, a microphone, touchscreen, mouse, keyboard, camera, tactile sensor, or any combination thereof. The chat devices may include one or more output devices, such as, for example, a display, speaker, haptic device, or any combination thereof.

The chat devices may include a chat client (e.g., chat client 122, chat client 124, chat client 126, and chat client 128). The chat client may be a program, function, or module of a computer program (not shown) executable by a processor of the message aggregation system 100. The chat client may generate one or more visual components, such as, for example, a virtual keyboard, a chat box, a slideshow, a video, or any combination thereof. The one or more visual components may be presented for a user on a display, such as, for example, a display connected to the chat devices or a separate display. In an embodiment, the chat client may generate a chat box including one or more combined messages. For example, the chat server 130, described below, may aggregate redundant messages and transmit the redundant messages to the chat devices. The chat client may interpret the transmission from the chat server 130 and generate a virtual representation of the redundant messages in a group chat environment. For instance, if the combined message comprises redundant messages stating "No audio", "No voice", and "I cannot hear", the combined message may indicate that no audio is available for one or more users as indicated by three messages. In an example, the chat client 126 may generate a visual representation of the combined message which may include a balloon with text stating "No audio available—3" or a similar statement. In another example, the chat client 126 may generate a visual representation of this combined message including a text balloon stating "No audio available" or a similar statement and a red bubble adjacent to the text balloon stating "3" to indicate a number of redundant messages with a common fact. Embodiments of generating a virtual representation of a combined message in a group chat environment are discussed in detail below with reference to FIGS. 2A-2B.

Chat server 130 may be a cloud computing node, computer server, server appliance, dedicated server, hybrid server, laptop computer, desktop computer, tablet computer, netbook computer, personal computer (PC), smart phone, another programmable electronic device, or any combination thereof. Chat server 130 may include internal and external hardware components, as depicted and described in further detail with respect to FIG. 4. Chat server 130 may include an aggregation application 132. The aggregation application 132 may be a program, function, or module of a computer program (not shown) executable by a processor of the message aggregation system 100. The aggregation application 132 may aggregate one or more redundant messages.

Figure 2B:
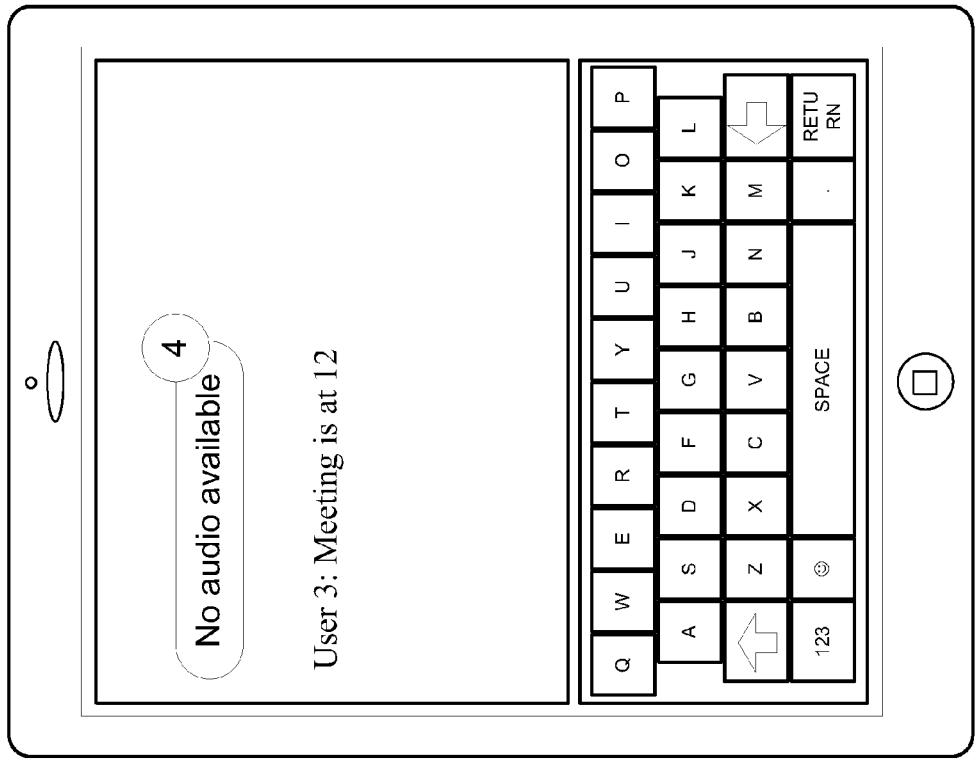
FIGS. 2A-2B depict a group chat environment, in accordance with an embodiment of the present invention.
Figure 2A:
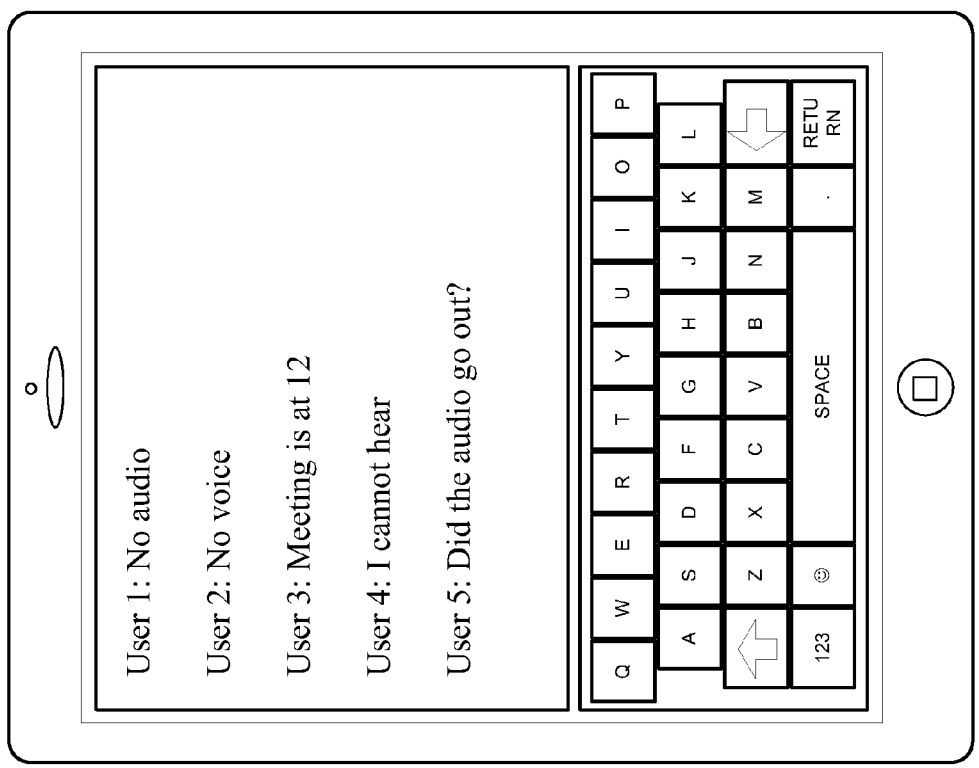

FIGS. 2A-2B illustrate a group chat environment, according to an embodiment of the present invention. FIG. 2A lacks an aggregation system 100, and FIG. 2B includes an aggregation system 100.

FIG. 2A is an example of a group chat environment lacking the aggregation system 100. In FIG. 2A, user 1 states "No audio", user 2 states "No voice", user 3 states "Meeting is at 12", user 4 states "I cannot hear", and user 5 states "Did the audio go out?". Due to redundant messages indicating that audio is not available, the message from user 3 stating "Meeting is at 12" may not be readily apparent to one or more users. In a scenario involving more users and/or more redundant messages, the message from user 3 may be even more hidden and/or buried.

FIG. 2B is an example of a group chat environment including the aggregation system 100. In FIG. 2B, each user transmits a same message as in FIG. 2A (i.e. user 1 states "No audio", user 2 states "No voice", user 3 states "Meeting is at 12", user 4 states "I cannot hear", and user 5 states "Did the audio go out?"). However, in FIG. 2B, the aggregation system 100 aggregates the redundant messages so that the messages from user 1, user 2, user 4, and user 5 are aggregated into a combined message. In an embodiment, the combined message may include one or more features to distinguish the combined message from a non-redundant message. For example, the combined message may include a different color, be contained in a unique shape, include an indicator for a number of messages combined, or any combination thereof. In an embodiment, the chat client may permit a user to obtain additional information about the combined message. For example, the combined message may include an indicator for a number of aggregated redundant messages, allow a user to click on the combined message to see a number of redundant messages, allow a user to click on the combined message to see original text of redundant messages that have been aggregated, or any combination thereof. In an example illustrated in FIG. 2B, a number 4 surrounded by a circle may indicate a number of redundant messages included in the combined message. A method for aggregating messages is described in detail below, with reference to FIG. 3.

Figure 3A:
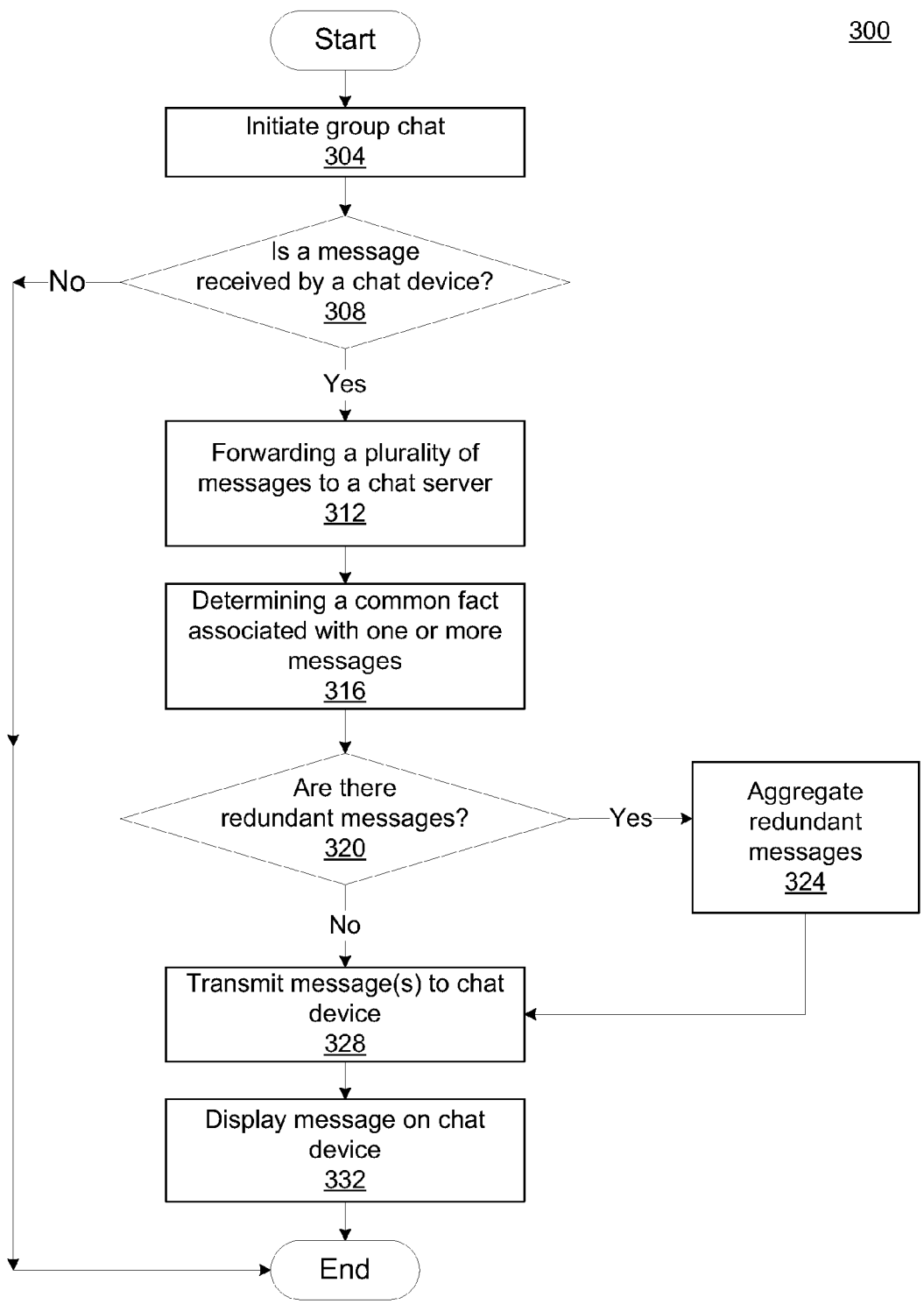
FIGS. 3A-3B depict a flowchart of a method for aggregating messages, in accordance with an embodiment of the present invention.

FIG. 3A is a flowchart of a method 300 for aggregating messages, using the message aggregation system 100 of FIG. 1, in accordance with an embodiment of the present invention. Steps of method 300 may be executed using a processor of a computer that encompasses, or is part of, message aggregation system 100, or another system. In an embodiment, the method 300 for aggregating messages may involve initiating a group chat (step 304), determining if a message is received on a chat device (decision 308), forwarding a plurality of messages to a chat server (step 312), determining a common fact associated with one or more messages (step 316), determining if redundant messages exist (decision 320), aggregating redundant messages (step 324), transmitting message(s) to a chat device (step 328), and displaying messages on a chat device (step 332).

Initiating a group chat on a chat client (step 304) may involve, for example, opening the chat client on one or more chat devices and connecting the one or more chat devices to the chat server 130 (FIG. 1). In an embodiment, the chat client may be configured to operate in conjunction with the aggregation application 132 (FIG. 1) on the client server 130. In another embodiment, the chat client and aggregation application 132 may be part of a same program located on one or more chat devices. Once one or more chat devices establishes a connection with the chat server 130, one or more users of the one or more chat devices may exchange messages. In an embodiment, the chat client may generate graphics formatted to include messages from one or more users and permit a chat device to add one or more messages. For example, the chat client (e.g., chat client 126) may include a virtual keyboard that a user (e.g., user 106) of a chat device (e.g., chat device 116) may use to input a message into a group chat.

Determining if a message is received by a chat device (decision 308) may involve establishing that text is included in a textbox and a message transmission step is performed. A message transmission step may involve an input by a user associated with transmitting a message. For example, a user may select "enter", "send", an arrow symbol, etc. to send a message. In another example, a user may say "enter", "send message", etc. to send a message. The chat device may receive an input associated with transmitting a message. In addition to a message transmission step, text may need to be included in the textbox. If no text is included and a message transmission step is performed, no message may be received by the chat client. However, if text is included in the text box and a message transmission step is performed, a message may be received by a chat device, such as, for example, the chat device 116 (FIG. 1).

Forwarding a message to a chat server (step 312) may involve transmitting a message received on a chat device to a chat server. A chat device (e.g., the chat device 116) may have one or more communication capabilities, such as, for example, near-field communication, far-field communication, or a combination thereof. A chat device may use one or more communication capabilities to transmit a message to a chat server (e.g., the chat server 130). In an example, the chat device 116 may transmit a message directly to the chat server 130. In another example, the chat device 116 may transmit a message to one or more intermediate devices which may transmit the message to the chat server 130. In an embodiment, a chat device and a chat server may be within one device, and thus step 312 may occur within the one device.

Determining a common fact associated with one or more messages (step 316) may involve fact extraction based on natural language processing. Processing messages using a natural language processing (NLP) based interpreter may involve translating a message from a natural language question or statement into a query or fact suited for a fact database. Fact extraction is a process of transforming natural language statements into structured facts. Fact extraction may be performed using any method known or contemplated, including NLP and/or machine learning. The level of detail or granularity of one fact (or information) extracted from messages may be predetermined and adjusted by methods known in the art (e.g. by adjusting statistical inferences). A computer may parse a body of text, sometimes referred to as a 'corpus' or 'text corpus', and use NLP to extract facts from this corpus. The extracted facts may be stored in a fact database, which may then be interrogated to answer questions. In an embodiment, the aggregation application 132 may parse a message and use NLP to extract facts from the message. In an embodiment, the aggregation application 132 may parse a plurality of messages and use NLP to extract facts from each of the plurality of messages. The extracted facts from each of the plurality of messages may be evaluated to determine if redundant messages exist, as is discussed below with reference to decision 320.

Embodiments of step 316 may involve (1) extracting facts from a plurality of messages based on natural language processing, (2) identifying a first fact associated with one message and a second fact associated with another message, and (3) determining a commonality between the first fact and the second fact. In an embodiment, a commonality between the first fact and the second fact may be determined if the first fact and the second fact are identical. In another embodiment, a commonality between the first fact and the second fact may be determined if the first fact and the second fact are associated with one or more words (e.g. keywords) that are identified as synonyms of one another. In another embodiment, a commonality between the first fact and the second fact may be determined if the first fact and the second fact are identified within a same fact category such as a "no audio" fact category. For example, one or more messages involving a lack of audio, sound, volume, etc. may be identified as existing within a same fact category. In a specific example, the aggregation application 132 may receive three messages (e.g. "no audio", "I cannot hear", "Is there no volume?", and "no sound") and may associate "no audio" with an extracted fact of "no audio", "I cannot hear" with an extracted fact of "no audio", "Is there no volume?" with an extracted fact of "no volume", and "no sound" with an extracted fact of "no audio". The extracted fact of "no volume" and the extracted fact of "no audio" may be in a same fact category of "noise and hearing." Since "no volume" and "no audio" may be in a same fact category, the aggregation application 132 may determine a commonality exists between the extracted fact of "no audio" and the extracted fact of "no sound". In an embodiment, a fact category may be a predefined list of one or more extracted facts, synonyms of keywords associated with an extracted fact, an extracted fact from one or more previous messages, or any combination thereof. Identifying a same fact category associated with extracted facts may enable determining more common facts than merely comparing words in each message. For example, when one or more messages include synonyms but not an exact word match, more redundant messages may be identified by identifying common extracted facts than by identifying common words. Thus, the aggregation application 132 may determine a common fact even if the messages do not include identical words. A common fact associated with one or more messages may be used to determine if redundant messages exist, as is discussed below with reference to decision 320.

Determining if redundant messages exist (decision 320) may involve identifying messages associated with a common fact. In an embodiment, redundant messages may be messages containing a common fact extracted by NLP. The aggregation application 132 may use NLP to extract facts from a plurality of messages and determine which messages of the plurality of messages are associated with a common fact. The messages of the plurality of messages which are associated with a common fact may be identified as redundant. For example, the aggregation application 132 may evaluate four messages, including "no audio", "I cannot hear", "what happened to the sound?", and "Let's meet at 12 tomorrow". The aggregation application 132 may use NLP to extract facts from each of the four messages and associate the first three messages with a same extracted fact of "no audio" and associate the fourth message with a suggested meeting time. Since the first three messages are associated with a same extracted fact of "no audio", the first three messages may be identified as redundant. As discussed in step 316, embodiments of the present invention may include other methods for determining a commonality between extracted facts, such as, for example, if the extracted facts are identical, contain synonymous keywords, are within a same fact category, or any combination thereof. Some embodiments of determining a commonality between extracted facts may have a broader threshold than others. For example, determining a commonality based on a same fact category may be broader than determining a commonality based on identical extracted facts. Some embodiments may permit a user to adjust a breadth of determining a commonality by, for example, basing the commonality determination on fact categories, synonyms, identical extracted facts, or any combination thereof. Other embodiments may permit a computing device to adjust a breadth of determining a commonality by, for example, basing the commonality determination on fact categories, synonyms, identical extracted facts, or any combination thereof.

Aggregating redundant messages (step 324) may involve combining messages associated with a common fact into a single combined message. In an embodiment, the aggregation application 132 may aggregate redundant messages and provide a message summary indicating a common fact indicated by each message. For example, the aggregation application 132 may evaluate three messages, including "no audio", "I cannot hear", and "no sound". The aggregation application 132 may combine the three messages into a single message stating "No audio available". In an embodiment, a combined message may include an indication of a number of messages combined into the combined message. For example, the aggregation application 132 may combine three messages into a single message stating "No audio available—3". In another example, the aggregation application 132 may combine three messages into an combined message stating a common fact and including a number of redundant messages in a bubble adjacent to the combined message.

In an embodiment, the aggregation application may use NLP to extract facts from a plurality of messages and associate a message with more than one extracted fact. If a message is associated with more than one extracted fact, and at least one extracted fact has a commonality with an extracted fact associated with another message, the aggregation application 132 may aggregate an entire portion of the redundant message into a combined message, aggregate a portion of the redundant message associated with a common fact into the combined message, separate a portion of the redundant message associated with an uncommon fact, or any combination thereof.

Transmitting message(s) to a chat device (step 328) may involve transfer data associated with redundant messages and/or non-redundant messages to a chat device. In an embodiment, the chat server 130 may use one or more communication capabilities to transmit data associated with redundant messages and/or non-redundant messages to a chat device (e.g. the chat device 116). In an example, the chat server 130 may transmit data associated with redundant messages and/or non-redundant messages directly to the chat device 116. In another example, the chat server 130 may transmit data associated with redundant messages and/or non-redundant messages to one or more intermediate devices which may transmit the message to the chat server 130. In an embodiment, a chat server and a chat device may be a same device, and thus step 328 may occur within a device or not at all.

Displaying messages on a chat device (step 332) may involve generating chat graphics and transmitting chat graphics to a display. In an embodiment, the chat client 126 may generate graphics for a group chat which may include data associated with redundant messages and/or non-redundant messages. For example, the chat client 126 may generate a region for one or more messages and permit one or more devices to add messages. The region for one or more messages, may include, for example, non-redundant messages, a combined message, a plurality of redundant messages, or any combination thereof. The combined message and/or the plurality of redundant messages may include, for example, a group of redundant messages aggregated in step 324.

Figure 3B:
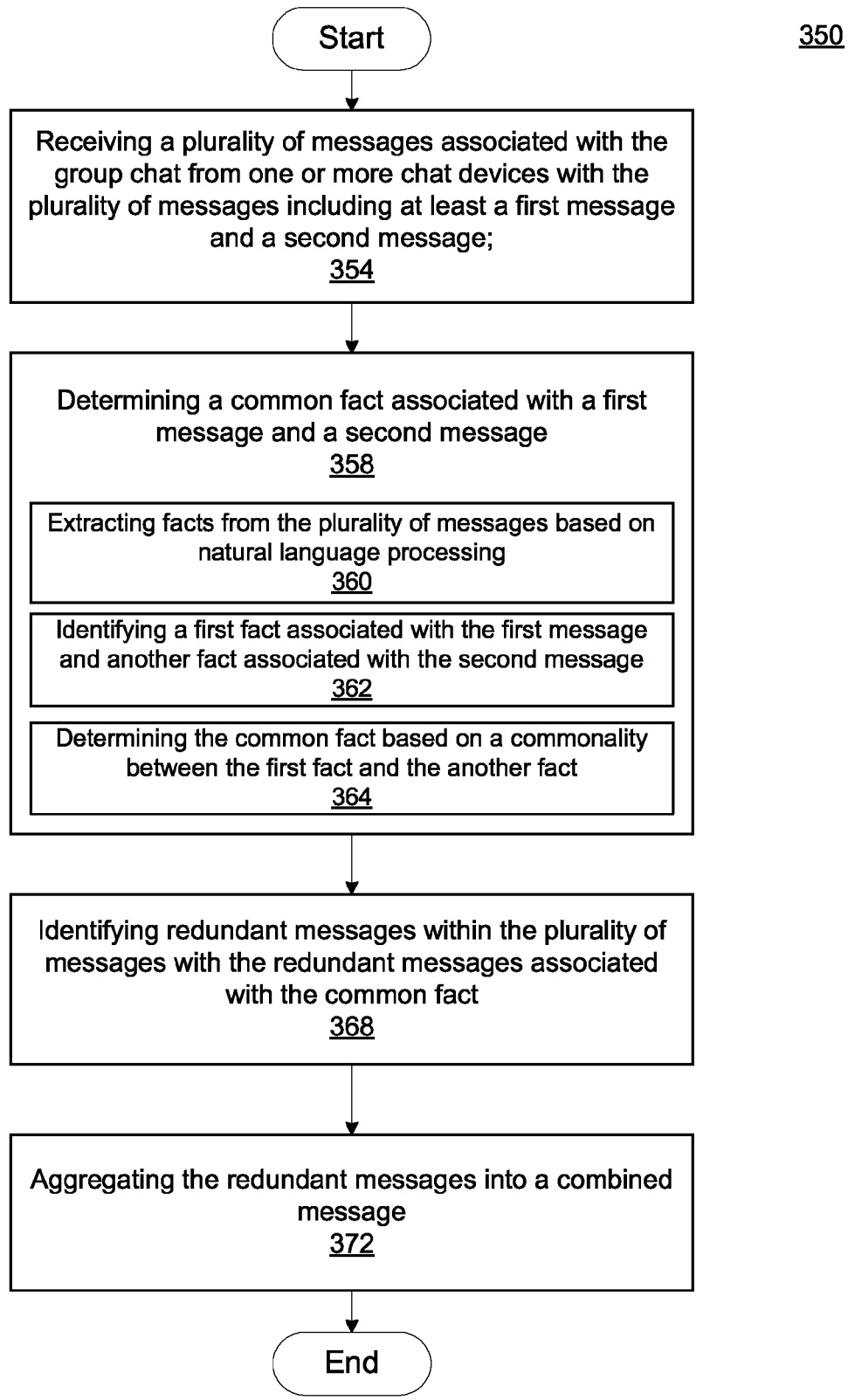

FIG. 3B is a flowchart of a method 350 for aggregating messages, using the message aggregation system 100 of FIG. 1, in accordance with an embodiment of the present invention. Steps of method 350 may be executed using a processor of a computer that encompasses, or is part of, message aggregation system 100, or another system. In an embodiment, the method 350 for aggregating messages may involve receiving a plurality of messages associated with the group chat (step 354), determining a common fact associated with the first message and the second message (step 358), identifying redundant messages within the plurality of messages (step 368), and aggregating the redundant messages into a combined message (step 372).

Figure 4:
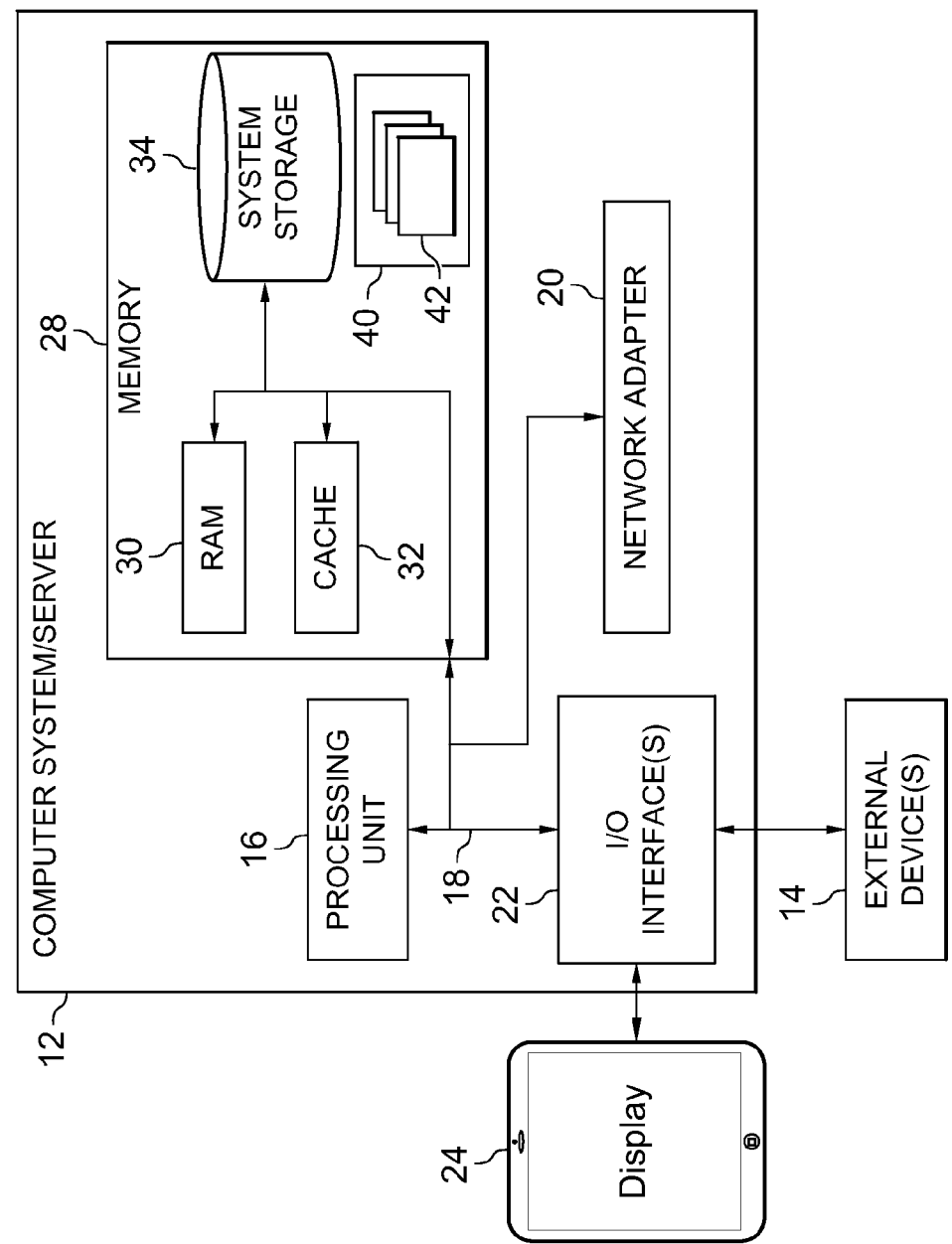
FIG. 4 depicts a schematic of a cloud computing node, in accordance with an embodiment of the present invention.

In an embodiment, each of the steps of the method 350 may be performed by a remote server, such as, for example, cloud computing node 10 of FIG. 4. In another embodiment, each of the steps of the method 350 may be performed by a local computing device, such as, for example, a chat device (e.g., chat device 112, chat device 114, chat device, 116, and/or chat device 118). In another embodiment, one or more of the steps may be performed by a remote server and one or more of the steps may be performed by a chat device. Each of the steps of the method 350 are described below.

Step 354 may involve receiving a plurality of messages associated with the group chat. In an embodiment, the plurality of messages may include at least a first message and a second message. In another embodiment, the plurality of messages may include a first message, a second message, and at least another message. In an embodiment, the plurality of messages may be received from one or more chat devices (e.g., chat device 112, chat device 114, chat device, 116, and/or chat device 118).

Step 358 may involve determining a common fact associated with the first message and the second message. In an embodiment, step 358 may include extracting facts from the plurality of messages based on natural language processing (step 360), identifying a first fact associated with the first message and another fact associated with the second message (step 362), and determining the common fact based on a commonality between a first fact and another fact (step 364). In an embodiment, step 358 may include any combination of step 360, step 362, and step 364.

Step 360 may involve extracting facts from the plurality of messages based on natural language processing. Processing messages using a natural language processing (NLP) based interpreter may involve translating a message from a natural language question or statement into a query or fact suited for a fact database. Fact extraction is a process of transforming natural language statements into structured facts. A computer may parse a body of text, sometimes referred to as a 'corpus' or 'text corpus', and use NLP to extract facts from this corpus. The extracted facts may be stored in a fact database, which may then be interrogated to answer questions. In an embodiment, the aggregation application 132 may parse a message and use NLP to extract facts from the message. In an embodiment, the aggregation application 132 may parse a plurality of messages and use NLP to extract facts from each of the plurality of messages. The extracted facts from each of the plurality of messages may be evaluated to identify redundant messages, as is discussed below with reference to decision 368.

Step 362 may involve identifying a first fact associated with the first message and another fact associated with the second message. For example, a fact may be extracted from the first message using NLP and another fact may be extracted from the second message using NLP.

Step 364 may involve determining the common fact based on a commonality between the first fact and another fact. In an embodiment, a commonality between the first fact and the another fact may be determined if the first fact and the another fact are identical. In another embodiment, a commonality between the first fact and the another fact may be determined if the first fact and the another fact are identified as synonyms of one another (e.g., contain synonymous keywords). In another embodiment, a commonality between the first fact and the second fact may be determined if the first fact and the another fact are identified within a same fact category. For example, one or more messages involving a lack of audio, sound, volume, etc. may be identified as existing within a same fact category. In a specific example, the aggregation application 132 may receive three messages (e.g. "no audio", "I cannot hear", "Is there no volume?", and "no sound") and may associate "no audio" with an extracted fact of "no audio", "I cannot hear" with an extracted fact of "no audio", "Is there no volume?" with an extracted fact of "no volume", and "no sound" with an extracted fact of "no audio". The extracted fact of "no volume" and the extracted fact of "no audio" may be in a same fact category of "noise and hearing." Since "no volume" and "no audio" may be in a same fact category, the aggregation application 132 may determine a commonality exists between the extracted fact of "no audio" and the extracted fact of "no sound". In an embodiment, a fact category may be a predefined list of one or more extracted facts, synonyms of an extracted fact, an extracted fact from one or more previous messages, or any combination thereof. Identifying a same fact category associated with extracted facts may enable determining more common facts than merely identifying words in each message. For example, when one or more messages include synonyms but not an exact word match, more redundant messages may be identified by identifying common extracted facts than by identifying common words. Thus, the aggregation application 132 may determine a common fact even if the messages do not include a same word. A common fact associated with one or more messages may be used to identify redundant messages, as is discussed below with reference to step 368.

Step 368 may involve identifying redundant messages within the plurality of messages. The redundant messages may be associated with the common fact. For example, when a first message and a second message are associated with a common fact, the first message and the second message may be identified as redundant.

Step 372 may involve aggregating the redundant messages into a combined message. For example, messages identified as redundant messages in step 368 may be aggregated into a single combined message. In an embodiment, the aggregation application 132 may aggregate redundant messages and generate a message summary indicating the common fact associated with the redundant messages. For example, the aggregation application 132 may evaluate three messages, including "no audio", "I cannot hear", and "no sound". The aggregation application 132 may combine the three messages into a single message stating "No audio available". In an embodiment, a combined message may include an indication of a number of messages aggregated into the combined message. For example, the aggregation application 132 may aggregate three messages into a single message stating "No audio available—3". In another example, the aggregation application 132 may aggregate three messages into a combined message stating a common fact and including a number of redundant messages in a bubble adjacent to the combined message.

In an embodiment, one or more of the redundant messages may be associated with more than one extracted fact. If a message is associated with more than one extracted fact, and at least one extracted fact is has a commonality with an extracted fact associated with another message, the aggregation application 132 may aggregate an entire portion of the redundant message into a combined message, aggregate a portion of the redundant message associated with a common fact into the combined message, separate a portion of the redundant message associated with an uncommon fact, or any combination thereof. For example, the aggregation application 132 may evaluate three messages, including "no audio", "I cannot hear and meeting at 12", and "no sound". The aggregation application 132 may (1) aggregate an entire portion the three messages into a single message stating "No audio available", (2) separate a portion of the second message stating "meeting at 12", (3) aggregate a portion of the second message stating "I cannot hear", or any combination thereof. For example, the aggregation application may separate a portion of the second message stating "meeting at 12" and aggregate a portion of the second message stating "I cannot hear" with the first and third messages and generate a combined message stating "No audio available" and generate a separate message stating "meeting at 12".

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
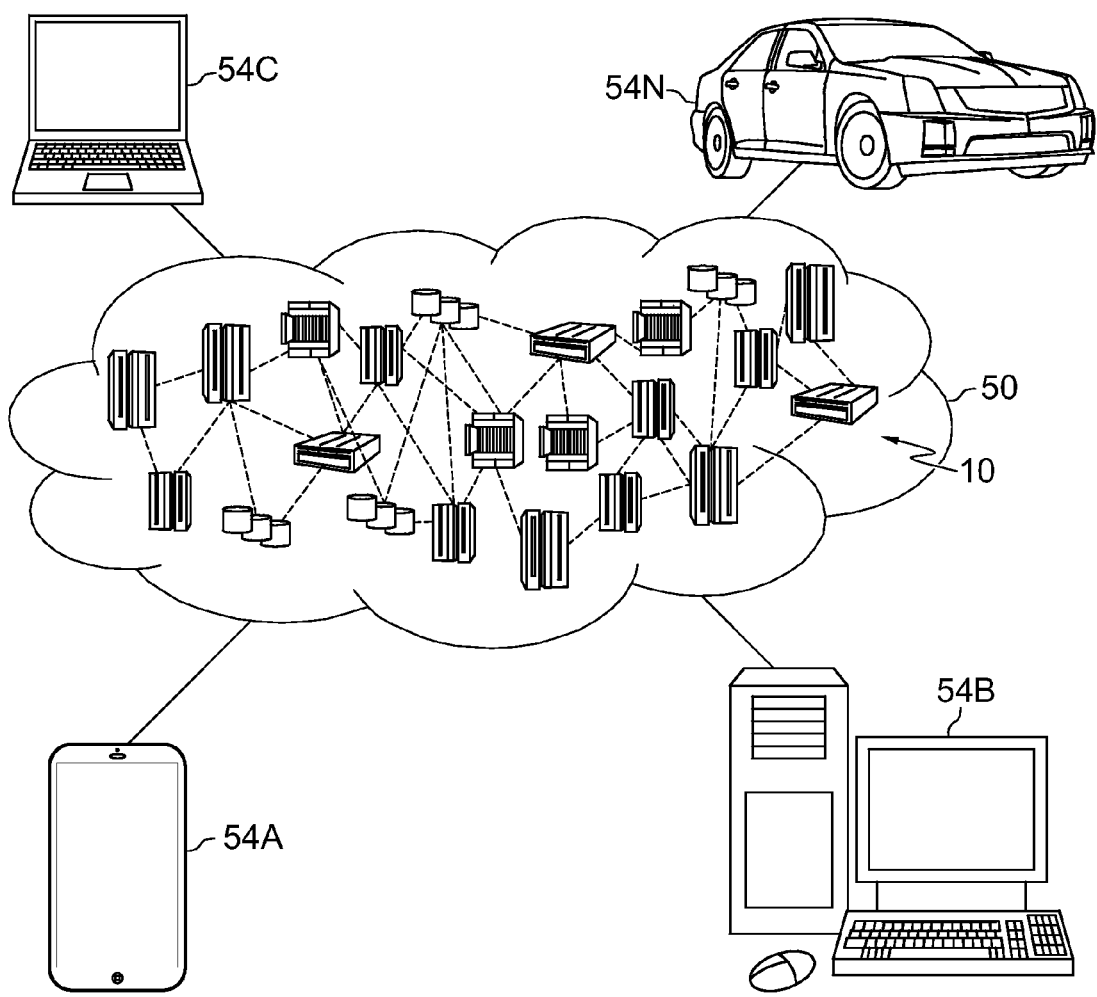
FIG. 5 depicts a cloud computing environment, in accordance with an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and aggregating redundant messages in a group chat 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for aggregating similar messages in a group chat on a computer, the method comprising:
   receiving, by the computer, a plurality of messages associated with the group chat from one or more chat devices, wherein the plurality of messages comprises at least a first message and a second message;
   determining, by the computer, a common fact associated with the first message and the second message, wherein the determining comprises:
      extracting facts from the plurality of messages based on natural language processing;
      identifying a first fact associated with the first message and another fact associated with the second message; and
      determining the common fact based on a commonality between the first fact and the another fact;
   identifying, by the computer, redundant messages within the plurality of messages, wherein the redundant messages are associated with the common fact; and
   aggregating, by the computer, the redundant messages into a combined message.

2. The method of claim 1, further comprising:
   providing the combined message to the group chat.

3. The method of claim 1, further comprising:
   providing a number of redundant messages aggregated into the combined message.

4. The method of claim 1, further comprising:
   providing the redundant messages to the group chat.

5. The method of claim 1, wherein the combined message comprises a statement corresponding to the common fact associated with the redundant messages.

6. The method of claim 1, further comprising:
   providing a time stamp indicating a time at least one redundant message of the redundant messages is received.

7. The method of claim 1, wherein at least one redundant message of the redundant messages comprises an uncommon fact.

8. The method of claim 1, wherein the method further comprises performing at least one of the following:
   aggregating, by the computer, a first portion of at least one redundant message associated with the common fact into the combined message; and
   separating, by the computer, a second portion of at least one redundant message associated with an uncommon fact.

9. A computer program product for aggregating similar messages in a group chat, the computer program product comprising a computer readable storage medium having program instructions embodied therewith, wherein the computer readable storage medium is not a transitory signal per se, the program instructions executable by a processor to cause a computer to perform a method comprising:
   receiving, by the computer, a plurality of messages associated with the group chat from one or more chat devices, wherein the plurality of messages comprises at least a first message and a second message;
   determining, by the computer, a common fact associated with the first message and the second message, wherein the determining comprises:
      extracting facts from the plurality of messages based on natural language processing;
      identifying a first fact associated with the first message and another fact associated with the second message; and
      determining the common fact based on a commonality between the first fact and the another fact;
   identifying, by the computer, redundant messages within the plurality of messages, wherein the redundant messages are associated with the common fact; and
   aggregating, by the computer, the redundant messages into a combined message.

10. The computer program product of claim 9, further comprising:
   providing the combined message to the group chat.

11. The computer program product of claim 9, further comprising:
providing a number of redundant messages aggregated into the combined message.

12. The computer program product of claim 9, further comprising:
providing the redundant messages to the group chat.

13. The computer program product of claim 9, wherein the combined message comprises a statement corresponding to the common fact of the redundant messages.

14. The computer program product of claim 9, further comprising performing at least one of the following:
aggregating, by the computer, a first portion of at least one redundant message associated with the common fact into the combined message; and
separating, by the computer, a second portion of at least one redundant message associated with an uncommon fact.

15. A system for aggregating similar messages in a group chat, the computer system comprising:
one or more computer processors;
one or more computer-readable storage media;
program instructions stored on the one or more computer-readable storage media for execution by at least one of the one or more computer processors, the program instructions comprising:
instructions to receive, by a computer, a plurality of messages associated with the group chat from one or more chat devices, wherein the plurality of messages comprises at least a first message and a second message;
instructions to determine, by the computer, a common fact associated with the first message and the second message, wherein the instructions to determine comprise:
instructions to extract facts from the plurality of messages based on natural language processing;
instructions to identify a first fact associated with the first message and another fact associated with the second message; and
instructions to determine the common fact based on a commonality between the first fact and the another fact;
instructions to identify, by the computer, redundant messages within the plurality of messages, wherein the redundant messages are associated with the common fact; and
instructions to aggregate, by the computer, the redundant messages into a combined message.

16. The system of claim 15, further comprising:
instructions to provide the combined message to the group chat.

17. The system of claim 15, further comprising:
instructions to provide a number of redundant messages aggregated into the combined message.

18. The system of claim 15, further comprising:
instructions to provide the redundant messages to the group chat.

19. The system of claim 15, wherein the combined message comprises a statement corresponding to the common fact of the redundant messages.

20. The system of claim 15, wherein the program instructions further comprise at least one of the following:
instructions to aggregate, by the computer, a first portion of at least one redundant message associated with the common fact into the combined message; and
instructions to separate, by the computer, a second portion of at least one redundant message associated with an uncommon fact.

* * * * *